July 4, 1939.  A. Y. DODGE  2,164,504
VARIABLE SPEED TRANSMISSION
Filed July 5, 1935   5 Sheets-Sheet 1
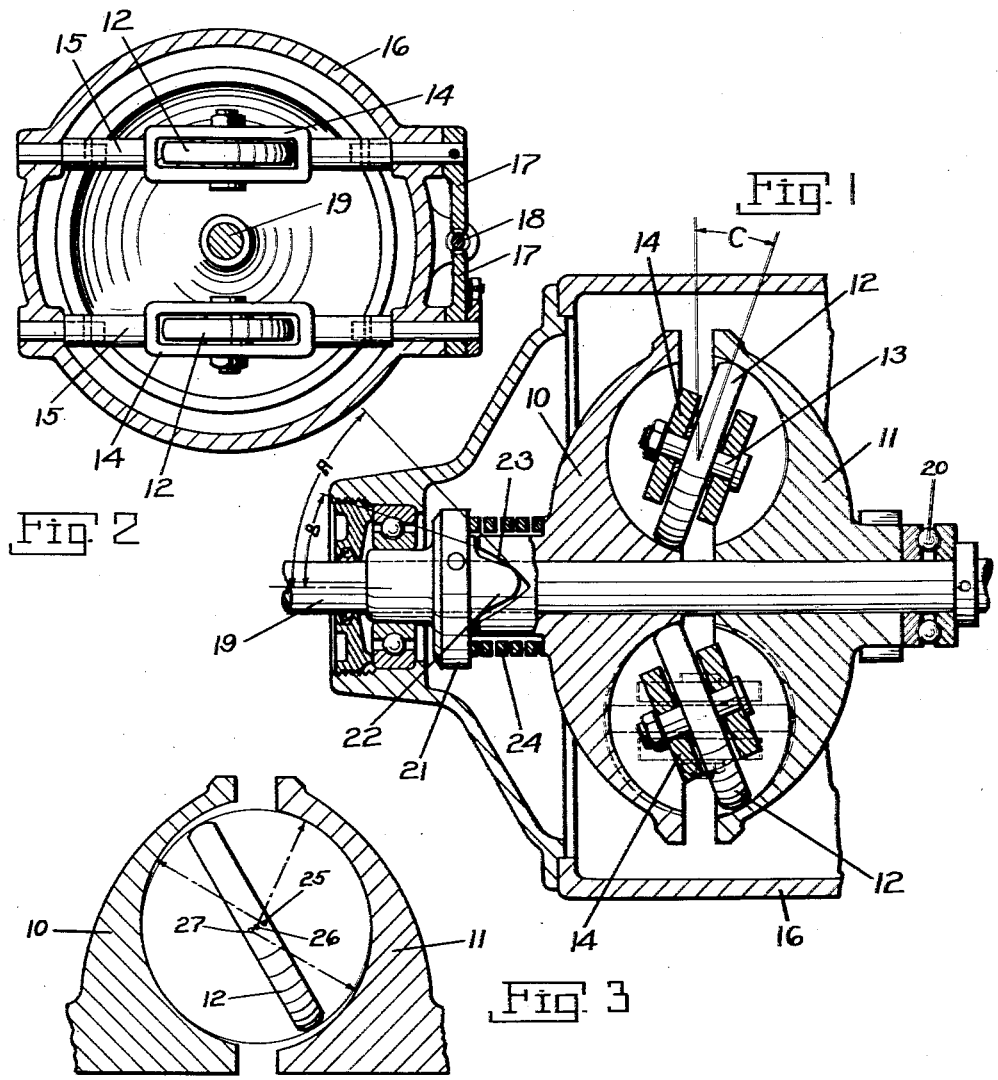
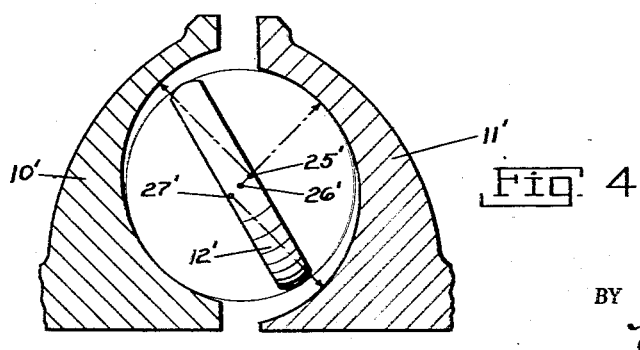
INVENTOR.
Adiel Y. Dodge
BY McConkey & Booth
ATTORNEY.

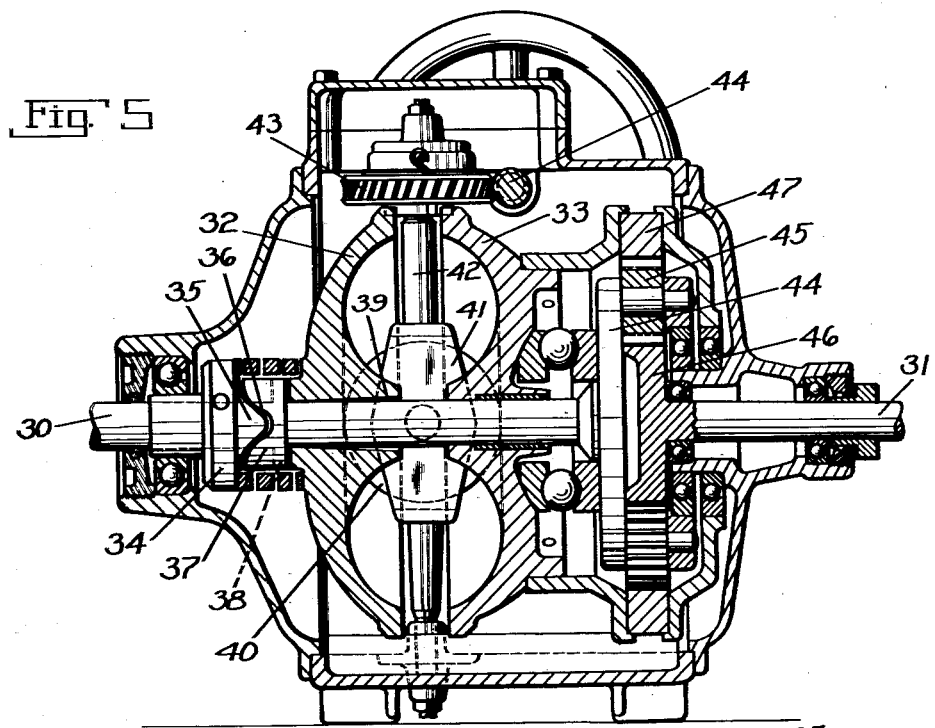
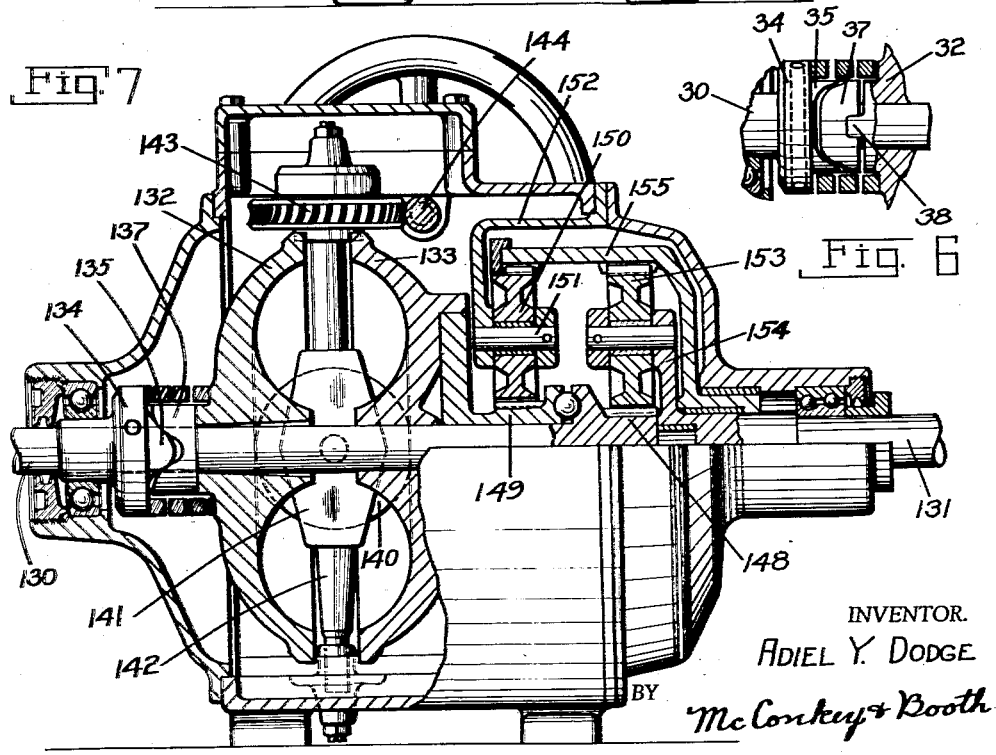

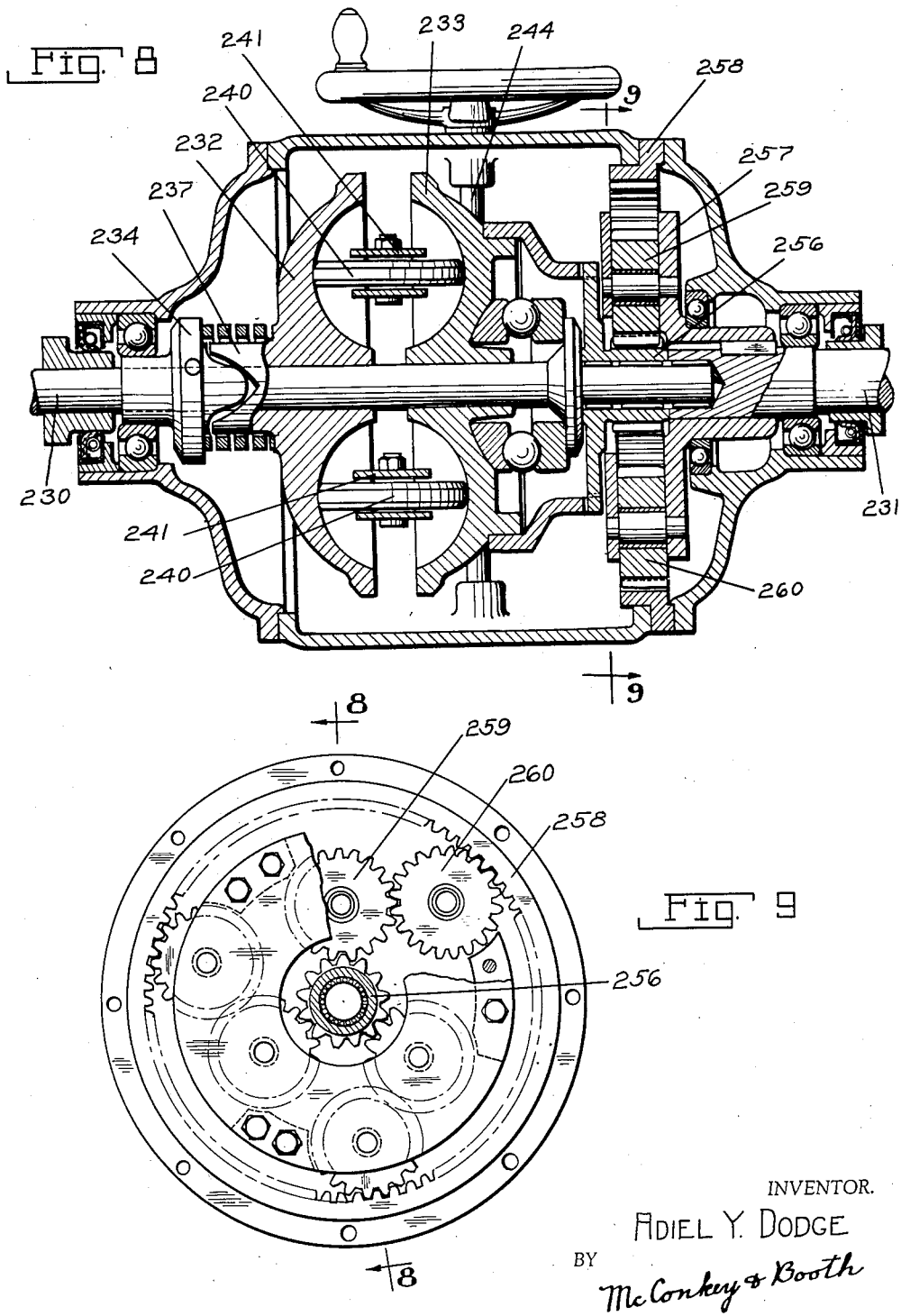

July 4, 1939.  A. Y. DODGE  2,164,504
VARIABLE SPEED TRANSMISSION
Filed July 5, 1935  5 Sheets-Sheet 4
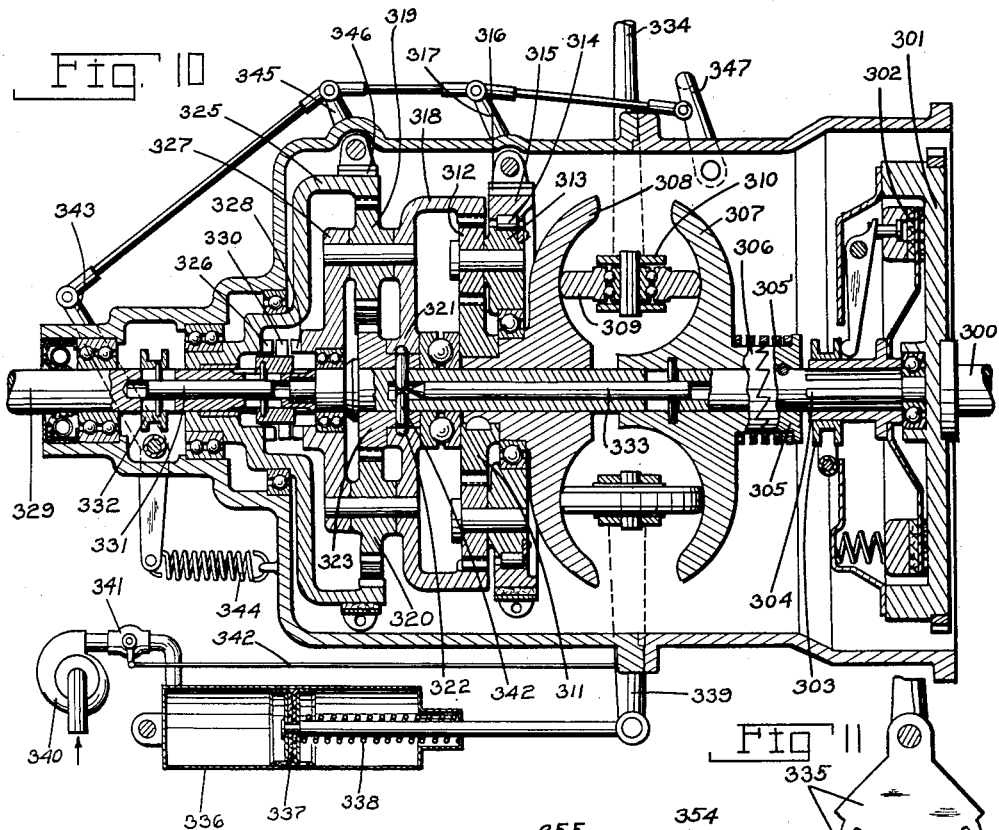
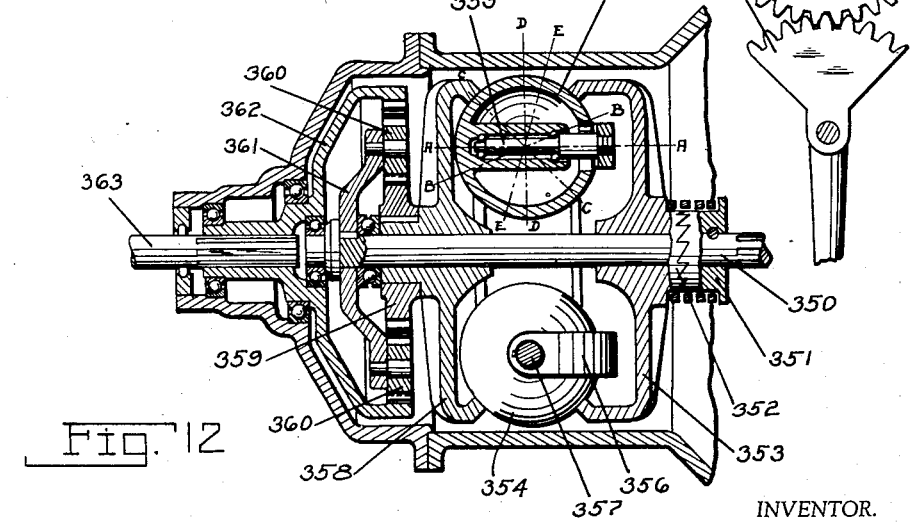
INVENTOR.
ADIEL Y. DODGE
BY
McConkey & Booth
ATTORNEY.

July 4, 1939.  A. Y. DODGE  2,164,504
VARIABLE SPEED TRANSMISSION
Filed July 5, 1935  5 Sheets-Sheet 5
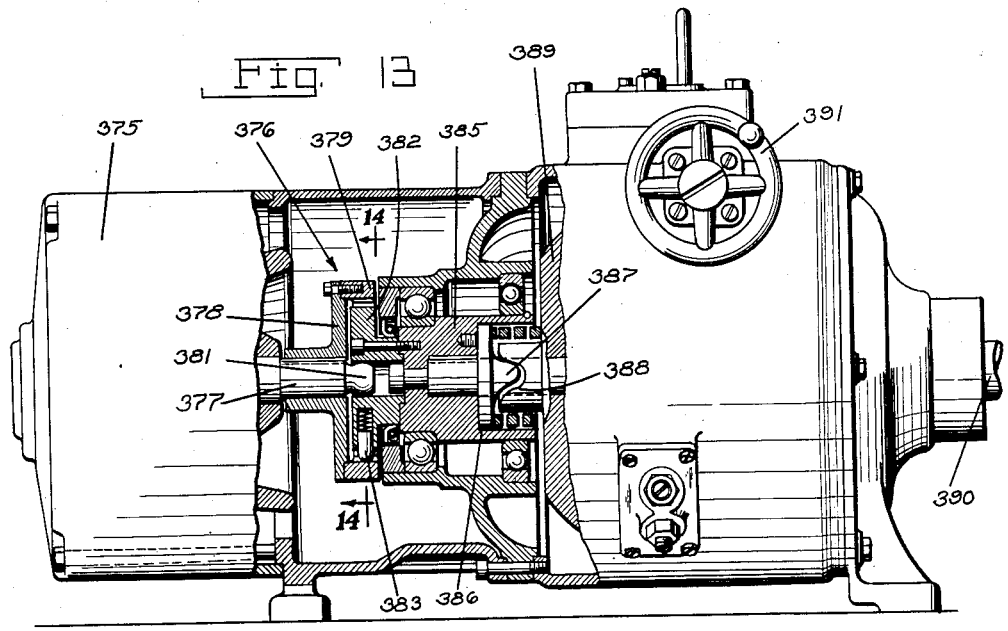
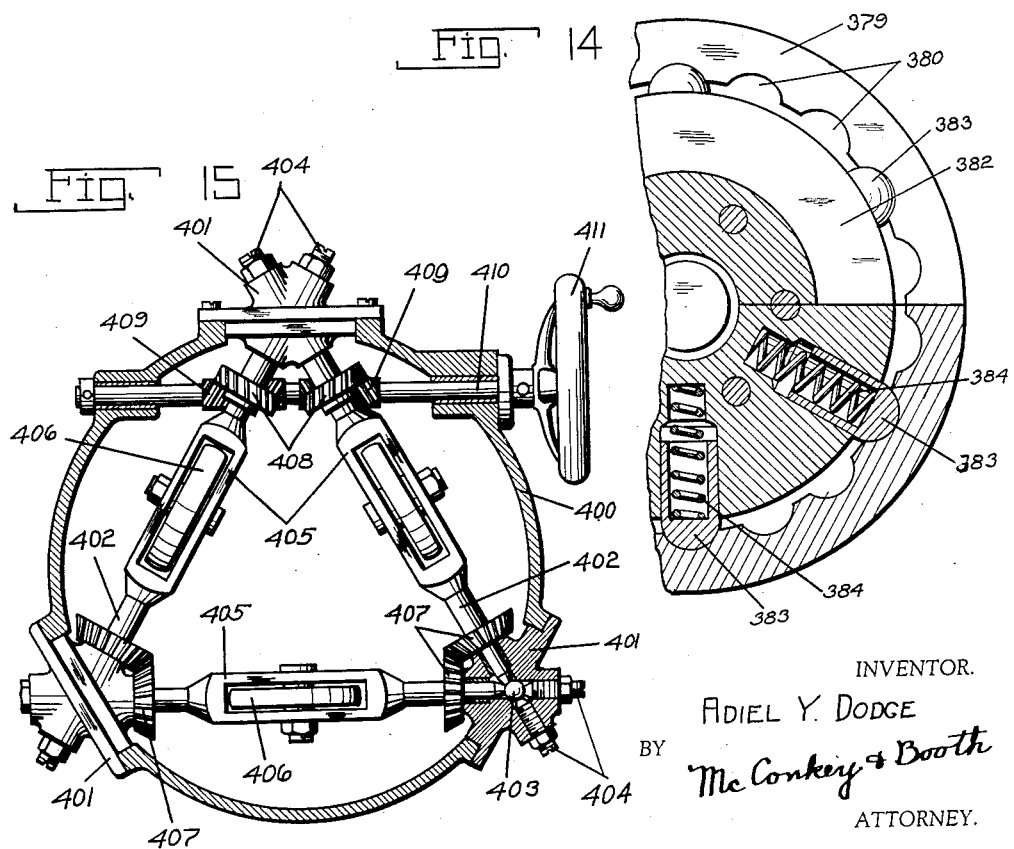
INVENTOR.
ADIEL Y. DODGE
BY McConkey & Booth
ATTORNEY.

Patented July 4, 1939

2,164,504

UNITED STATES PATENT OFFICE 2,164,504

VARIABLE SPEED TRANSMISSION

Adiel Y. Dodge, South Bend, Ind.

Application July 5, 1935, Serial No. 29,797

8 Claims. (Cl. 74—284)

This invention relates to variable speed transmissions and more particularly to friction toroidal transmissions and to novel combinations of such transmissions with gearing.

This application is a continuation in part of my copending applications 604,372 filed April 11, 1932 and 643,359 filed November 19, 1932.

One of the objects of the invention is to provide a friction toroidal transmission in which the optimum pressure is maintained between the parts regardless of variations of position thereof due to varying speed ratios.

In transmissions employing traction rollers the radial pressure on the rollers which holds them against slipping is preferably made dependent on the transmitted torque and the ratio between the radial pressure and transmitted torque is maintained substantially constant as the rollers are shifted to vary the torque and speed ratios. This gives the lightest radial loads on the rollers, and therefore the smallest friction loss, which will deliver the required torque at any given speed.

Another object of the invention is to provide a novel transmission including friction and gear units so connected that the friction unit will be compelled to carry only a small part of the transmitted torque. Preferably the friction and gear units are connected in series multiple, that is both the driving and driven members of the friction unit are connected to different elements of the gear unit.

A further object of the invention is to provide a friction toroidal transmission including novel means to adjust the friction rollers to vary the speed ratio.

According to one desirable arrangement embodying the invention a friction toroidal unit is provided constituted by a pair of friction discs and rollers mounted between and engaging the discs. One of the discs is connected to a driving shaft by a cam coupling which urges it toward the other disc with a component of the driving torque and the cam angle is preferably varied to vary the component in accordance with the axial position of the disc. The rollers are mounted in cages which can be turned to vary the driving ratio and the discs are preferably so shaped that turning of the roller cages moves the driving disc axially. By this means the torque component urging the discs together can be varied as the roller angle varies to maintain a substantially constant ratio between the transmitted torque and the radial load on the rollers.

The driving shaft is also preferably connected to cne element of a gear chain and the driven disc is connected to another element of the gear chain, a third gear chain element being connected to the driven shaft. A fourth element of the gear chain may be fixed to provide a reactance point or fulcrum for torque multiplication.

Other objects, advantages and novel features including novel subcombinations and particular elements will be apparent from the following detailed description when taken in connection with the accompanying drawings showing several embodiments of the invention and in which:

Figure 1 is a central section with parts in elevation of a friction toroidal transmission embodying the invention;

Figure 2 is a central sectional view of the transmission of Figure 1 with parts in elevation;

Figures 3 and 4 are detail views indicating the construction of the discs of Figures 1 and 2;

Figure 5 is a central section of a transmission embodying the invention;

Figure 6 is a view of a detail of the transmission of Figure 5;

Figure 7 is a central section with parts in elevation of another transmission embodying the invention;

Figure 8 is a section of another transmission embodying the invention on the line 8—8 of Figure 9;

Figure 9 is a section on the line 9—9 of Figure 8;

Figure 10 is a sectional view of another transmission embodying the invention and illustrating more or less diagrammatically a control system;

Figure 11 is a detail view of a part of the control mechanism of Figure 10;

Figure 12 is a sectional view of still another form of transmission illustrating a modified form of friction drive;

Figure 13 is a view with parts in section and parts in elevation of a power unit assembly;

Figure 14 is a partial section on the line 14—14 of Figure 13; and

Figure 15 is a view with parts in section and parts in elevation of mechanism for adjusting the friction rollers.

The transmission shown in Figures 1 to 4 is constituted by a pair of coaxial discs 10 and 11 having opposed toroidal grooves therein and a set of friction or traction rollers 12 engaging the grooves and mounted for swivelling adjustment to vary the points of contact with the grooves. The rollers 12 are rotatably mounted on axles 13 carried by frames or cages 14 which are rigidly carried by rods 15. The rods 15 are journalled in a casing 16 and at one end carry gear segments 17 meshing with a suitable worm gear or rack 18 by which swivelling of the rollers may be controlled.

Both discs 10 and 11 are freely mounted on a driving shaft 19 driven from any suitable source of power. Disc 11 is held against endwise movement on the driving shaft by a thrust bearing 20 and disc 10 is coupled to the driving shaft by a novel cam means whereby an increased transmitted torque will cause an increase in the pressure between the discs and on the rollers.

It will be noted that swivelling movement of the rollers not only changes the effective radii of the driving and driven discs but also changes the angle of the rollers to the applied axial pressure. Thus, in the position of the rollers shown in full lines in Figure 1, the effective radius of the driving disc 10 is relatively small, that of the driven disc 11 is relatively large, and the inclination of the rollers 12 is such that an axial pressure urging the discs toward each other creates a relatively greater component of pressure radially of the rollers to produce a pressure between the rollers and discs greater than the axial pressure on the discs. In the dotted line position of Figure 1 the effective radii of the driving and driven discs are equal and since the discs are parallel to the axis the radial pressure thereon is equal to the axial pressure urging the discs together.

In order to compensate for this variation in radial component on the rollers, the grooves in the friction wheels are formed in such a manner that swivelling of the rollers produces relative axial movement of the discs and the cam drive between the driving shaft and driving disc is arranged to vary the axial component of the transmitted torque in accordance with the axial position of the driving disc.

The cam drive, as illustrated in Figure 1, is constituted by a collar or flange 21 secured to the driving shaft and having formed thereon a pair of projecting lugs 22 shaped to provide suitable cam engaging surfaces. The lugs 22 project into cam notches 23 in a collar or sleeve formed integrally with or secured to the driving disc 10. The cam notches 23 are shaped to provide an angle A of approximately 45° at the inner end and slope smoothly out to an angle B of approximately 19° at the outer end. Preferably a compression spring 24 acts between flange 21 and the driving disc 10 to apply a preload to the rollers. With this construction it will be apparent that when lug 22 engages the cam notch 23 adjacent its inner end at the portion of angle A, the driving torque will create a greater axial component on the driving disc than when lug 22 engages the cam notch adjacent its outer end at the portion of angle B.

Figure 3 shows one desirable form of the toroidal grooves in the friction discs in which the groove in disc 10 is formed about a center 25 to the right and somewhat outside of the axis 26 about which the disc 12 swivels and the groove in disc 11 is formed about a center 27 to the left and somewhat inside of said axis 26. When the rollers are in the position shown in Figure 1 they engage the toroidal grooves in such a position as to permit slight inward movement of the disc 10 so that the lug 22 will engage the cam surface 23 at a point between its ends where the cam angle is somewhere between angle A and angle B. As the rollers are turned clockwise, as viewed in Figures 1 and 3, their points of engagement with the toroidal grooves vary, producing an axially outward movement of the driving disc 10 and cam until the planes of the rollers reach the planes of the three centers 25, 26, and 27, at which time the driving disc 10 is at its position farthest from disc 11 and lug 22 engages cam 23 at its innermost portion where its angle is A. In this position the axial component of the transmitted torque is greatest since the angle A is the greatest cam angle. Upon further clockwise turning of the rollers, the rollers will progressively engage the grooves at points permitting varying inward movement of the driving disc 10 and cam until when the rollers are in the position of Figure 3 the lug 22 engages the cam at its outer end where the cam angle is B. This position produces the least axial component of the transmitted force but the radial pressure on the rollers will be at substantially the optimum value since the axial force will be increased due to the angle of the rollers.

Figure 4 shows a modification of the arrangement of Figure 3, parts therein corresponding to like parts in Figure 3 being indicated by the same reference numerals primed. This construction is substantially the same as that of Figure 3 except that the centers 25' and 27' are spaced farther from the axis 26' and lie in a plane at an angle of substantially 45° to the axis of the driving shaft instead of the much flatter angle of Figure 3. This modification may be preferable to that of Figure 3 under certain conditions while under other conditions still other arrangements may be desirable. It will be obvious, however, that by proper choice of designs the desired pressure between the discs and rollers may be obtained for all positions of the rollers in their swivelling movement.

It is desirable to maintain the pressure on the rollers such that the pressure times the coefficient of friction between the rollers and grooves will be substantially equal to and only slightly greater than the tangential force on the rollers at the points of contact with the grooves. This arrangement insures that the rollers will not slip and maintains the losses due to friction at a minimum. In the construction of Figures 1 to 4 this result is attained by proper design of the cam and grooves and can be produced under all conditions by proper design of these parts.

A formula for designing the cam may be derived as follows: Let R equal the radius from the contact point of the rollers and the groove in disc 10 to the axis of the shaft 19 and $r$ equal the means effective radius of the cam from the same axis. Let F equal the force applied on the cam by lug 22 and T equal the tangential force on the rollers. Then the axial force exerted by the cam which can be called $Fa$ will equal $F \tan A$ where A is the cam angle. If C is the angle between the plane of the roller and a perpendicular to the axis of shaft 19, the radial force on the roller, designated B, will be equal to $Fa \operatorname{cosec} C$ or $F \tan A \operatorname{cosec} C$.

It will be apparent that TR must always equal $Fr$ since the torques must balance. If we call K the constant distance from the center of the roller to the axis of shaft 19 and D the radius of the roller then R equals $K - D \cos C$. It will be noted that as angle C increases to more than 90° it becomes negative so that this formula always represents the true value of R. Substituting this value of R in the above equation we find that $T(K - D \cos C)$ equals $Fr$ or that T equals $Fr$ over $K - D \cos C$.

The desired condition in which the tangential force on the roller equals the radial pressure times the coefficient of friction may be expressed as $T = Bm$ where $m$ equals the coefficient of friction between the roller and groove. Substituting the values derived above in this equation $Fr$ over $K - D \cos C$ equals $mF \tan A \operatorname{cosec} C$. Therefore $\tan A$ equals $r \sin c$ over $m(K - D \cos C)$ since the F cancels out. From this formula the desired cam and groove formation can be calculated by substituting values of C and solving for corresponding values of A and designing the grooves in the discs to locate lug 22 on that portion of the cam having the correct angle for the angle of the rollers at that time.

Figure 5 illustrates a transmission including a planetary gear set and a friction-toroidal drive connected together in a novel manner. As shown this transmission is constituted by a driven shaft 30 and a coaxial driving shaft 31 between which power is to be transmitted. A pair of discs 32 and 33 are freely mounted on the driven shaft and have opposed toroidal grooves therein which may be formed as described in Figures 1 to 4. The driven shaft carries a collar or flange 34 having projecting lugs 35 thereon extending into cam grooves 36 in a collar 37. The cam grooves 36 and lugs 35 may, if desired, be formed as described in connection with Figures 1 to 4. The collar 37 may be drivably connected to the driven disc 32 by a pivotal connection 38 which is arranged at right angles to the cam grooves 36 so that the disc 32 is free to move to align itself with the rollers, the hub of disc 32 preferably being enlarged as indicated at 39 to facilitate such movement.

Two or more rollers 40 are arranged between the friction discs to transmit the drive therebetween and are mounted in frames 41 carried by shafts 42 journalled in the transmission casing. Shafts 42 carry worm gears 43 at one end adapted to mesh with a worm 44 which may be turned by hand or any other suitable means to adjust the angle of the rollers.

At its inner end the driven shaft 30 carries a frame 44 forming a planet carrier on which a series of planet gears 45 are rotatably mounted. The planet gears are in mesh with a sun gear 46 which is secured to the driving shaft 31 and a ring gear 47 which is drivably connected to the driving disc 33 of the friction drive. Thus there are provided two paths of power flow from the driving to the driven shaft, one through sun gear 46, planet gears 45 and carrier 44 to the driven shaft 30, and another through the sun gear 46, planet gears 45, ring gear 47, disc 33, roller 40, driven disc 32, cam 36, and collar 34 to the driven shaft 30.

It will be noted that both paths of drive tend to rotate the driven shaft 30 in the same direction. Thus rotation of the sun gear tends to turn the carrier in the same direction in which it is rotating while rotation of the sun gear tends to turn the ring gear in the direction opposite to that in which it is rotating. However, since rotation of the ring gear is opposite to that of the driven shaft due to reversal of direction in the friction unit, it also tends to turn the driven shaft in the direction of rotation of the driving shaft.

It will further be noted that the reaction torque is divided at the gearing and only a part thereof is transmitted to each path of power flow so that the rollers are compelled to carry only a fraction of the output torque. From an examination of the gearing it will be apparent that the reaction torque tends to oppose movement of all of the gearing elements in the direction in which they are driven by the driving shaft. Thus power is transmitted directly from the driving shaft to the driven shaft and the disadvantages incident to a "regenerative" or "run around" power circuit in which the transmission elements are compelled to carry several times the output torque are avoided.

Figure 7 illustrates a transmission similar to that of Figure 5 but turned end for end and embodying a different gearing arrangement. In this figure parts corresponding to like parts in Figure 5 are designated by the same reference numerals plus 100. In the arrangement of Figure 7 a double planetary gearing is employed including two sun gears 148 and 149, connected to the driving shaft 130 and to the driven disc 133 of the friction toroidal unit respectively. The sun gear 149 meshes with a series of pinions 150 rotatably mounted on axles 151 carried by a frame or gear carrier 152 which is rigidly secured to the transmission housing. The sun gear 148 meshes with a series of planet pinions 153 which are mounted on a gear carrier 154 secured to the driven shaft 131. An annular sleeve 155 is freely mounted on bearings on the driven shaft and the transmission housing and has two series of internal teeth meshing respectively with pinions 150 and 153.

In operation of the modification of Figure 7, rotation of the driving shaft tends to turn the driven shaft in the same direction through gears 148 and 153. The driving shaft turns disc 132 in its direction of rotation and this drive is reversed through roller 140 to turn the disc 133 and sun gear 149 in the opposite direction. The direction of rotation of the sun gear 149 is again reversed through pinions 150 to drive the sleeve 155 in the direction of rotation of the driving shaft, thus tending to turn the driven shaft in the same direction as the driving shaft is turning.

It will be noted that the transmission of Figure 7 includes two fixed members to act as fulcrums for torque multiplication, namely, the roller cage 141 and member 152 which carries pinions 150. Thus the reaction torque is not only divided between two paths of power flow but a second fulcrum is provided in addition to the roller mounting whereby the torque load which must be carried by the rollers is further reduced.

Figures 8 and 9 illustrate another modified arrangement, parts therein corresponding to like parts in Figure 5 being indicated by the same reference numerals plus 200. In this modification a single planetary chain of gearing is employed including a sun gear 256 connected to the driven disc 233 of the friction drive, a gear carrier 257 connected to the driven shaft 231 and a ring gear 258 fixed to the transmission casing. The planet carrier 257 carries a set of planet gears 259 meshing with the sun gear 256 and a second set of planet gears 260 meshing with the planet gears 259 and with the ring gear.

In operation of the modification of Figures 8 and 9 the driving shaft 230 turns the driving disc 232 in the same direction and this drive is reversed through the rollers 240 to turn the driven disc 233 and sun gear 256 in the opposite direction. Due to the double planet arrangement, the sun gear turns the gear carrier 257 in a direction opposite to its direction of rotation so that the driven shaft will turn in the same direction as the driving shaft.

Figure 9 also serves to illustrate a desirable arrangement of planetary gearing which may be included in the planetary gearing of any of the other illustrated modifications. It will be noted from an inspection of Figure 9 that the planet gears are irregularly spaced peripherally, radii from the axis through the centers of the gears of each set forming two angles of 123¾° and one angle of 112½°. With this arrangement teeth on the various planet gears come into full mesh with teeth on the sun and ring gears at different times, thus reducing noise and insuring that at least one tooth is in full mesh at all times.

Figure 10 illustrates a transmission and control system therefore which is particularly adapted for use on automotive vehicles, constituted by an engine shaft 300 which is connected to a flywheel 301 preferably forming one of the elements of a clutch 302 which may be operated in the usual manner through a collar 303. The driven element of the clutch 302 is splined to a driving shaft 304 to which is drivably connected a collar 305 formed with slopping teeth thereon to cooperate with complementary teeth formed on a hub 306 of a friction driving disc 307 which is freely mounted on the driving shaft 304. Preferably a compression spring 305' acts between collar 305 and hub 306 to urge them apart. A suitable driven disc 308 is also freely mounted on the shaft 304 and the discs 307 and 308 are formed with opposed toroidal grooves to engage rollers 309 which transmit torque from the driving to the driven disc. The rollers 309 are rotatably mounted in frames or cages 310 which are mounted in the transmission casing on journalled rods (not shown) in the same manner as cages 41 of Figure 5 are mounted on journalled rods 42.

The driven disc 308 has a longitudinally extending hub to which a sun gear 311 is secured, the sun gear 311 meshing with a set of planet gears 312 rotatably mounted on an annular carrier 313. The carrier 313 is rotatably mounted on the hub of the driven disc 308 and engages a suitable one-way clutch 314 which acts between the carrier and an annular ring 315. A stationary band brake 316 encircles the ring 315 and is provided with an operating lever 317 whereby the brake 316 can be engaged with the ring 315 or can be released to permit free rotation of said ring.

The planet gears 312 are in mesh with an internal gear 318 which carries two sets of intermeshing planet gears 319 and 320 and which has a hub 321 freely mounted on the driving shaft 304. The hub 321 is provided with internal keyways 322 for a purpose to appear hereinafter.

One set of planet gears 320 carried by the ring 318 mesh with a sun gear 323 mounted on the driving shaft 304 and keyed thereto by radially sliding keys 342. The other set of planet gears 319 mesh with a ring gear 325 which is rotatably mounted in the transmission housing and which carries an inwardly facing set of dog clutch teeth 326. An annular ring 327 is rotatably mounted on an extension of the driving shaft and is secured to the ring gear 318, preferably through the axles of planet gears 319 and 320, and carries a set of dog clutch teeth 328 spaced from and facing the teeth 326.

A suitable driven shaft 329 is journalled in the transmission housing with its inner end journalled in the driving shaft and has a clutch member 330 slidably keyed thereon and movable into engagement with either the clutch teeth 326 or 328. The clutch member 330 is pinned to a rod 331 which is slidably mounted in the driven shaft 329 and which is pinned at its other end to a collar 332 which is slidably mounted on the driven shaft, the pins in each instance extending through slots in the driven shaft.

A rod 333 is slidably mounted in the driving shaft 304 and is pinned at one end to the driving disc 307 by a pin extending through slots in the driving shaft. The other end of the rod 333 is tapered and is adapted to engage the sliding keys 324 to cam them out into engagement with the keyways 322 in the hub 321, thereby to key the driving shaft 304, sun gear 323 and ring gear 318 together.

In order to control operation of the transmission, a control lever 334 is provided connected to turn the rollers 309 about their swivelling axes. The lever 334 may be connected to the rollers either directly or through suitable gearing but is preferably so arranged that movement thereof in a clockwise direction as viewed in Figure 10 turns the rollers outwardly on disc 308 and inwardly on race 307. The rollers 309 are preferably geared together by segments 335 (Figure 11) to turn together.

Power means are preferably provided to augment the manual force applied to lever 334, such means as shown being constituted by a cylinder 336 having a piston 337 therein urged in one direction by a spring 338. The piston 337 is connected to a lever 339 which may form an extension of lever 334 or which may be connected thereto or to one of the segments 335 as desired. Fluid under pressure for operating the piston 337 may be supplied by a suitable pump or blower 340 driven by a rotating part of the engine or the vehicle and discharging into the cylinder 336. A valve 341 is provided to control admission of fluid to the cylinder, the valve preferably being controlled by a link 342 connected to a suitable follow-up linkage, not shown. If desired, operation of the transmission could be made fully automatic by providing a suitable automatic control such as a speed responsive governor to control operation of the valve 341.

The clutch 330 is controlled through the collar 332 and rod 331 by a pivoted lever 343 having an extension to which a spring 344 is secured tending to move the collar in a direction to engage the clutch member 330 with the teeth 326 on ring gear 325. The lever 343 is linked to a pivoted operating lever 345 of a stationary band brake 346 which encircles the ring gear 325. Lever 345 is linked to the lever 317 and to a lever 347 which is pivoted to the transmission housing and has its free end arranged in the path of movement of the lever 334.

In operation of the transmission of Figure 10 for normal forward drive, the driving shaft turns the collar 305 which transmits torque to the driving disc 307 through the cams on collar 305 and the hub 306 of the driving disc. The driving disc turns the driven disc 308 in the reverse direction through rollers 309 and this turns gear 311 in the reverse direction. Brake 316 is normally engaged at this time to hold the carrier 313 against reverse rotation through the one-way clutch 314, so the direction of gear 311 is reversed through the planet gears 312 to drive the combined ring gear and planet carrier 318 forwardly. This carries the planet gears 319 and 320 forwardly and at the same time the sun gear 323 which is connected to the driving shaft and which meshes with planet gears 320 is driven forwardly. Both of these forces tend to turn the ring gear 325 forwardly so that this latter member is rotated by the summative efforts of the sun gear 323 and the ring gear 318. The clutch member 330 is held engaged with teeth 326 by the spring 344 and the driven shaft 329 is therefore turned by the ring gear 325 in the same direction and at the same speed.

In order to vary the transmission ratio the lever 334 is moved to swivel the rollers 309, movement thereof in a clockwise direction increasing the ratio and in a counterclockwise direction reducing the ratio and producing a ratio approaching 1:1. Preferably the parts are so proportioned that the driving ratio is substantially 1:1 when the rollers 309 are in engagement with the driving disc 307 adjacent the outer edge thereof. A slight further turning of the rollers causes them to leave the disc 307 and permits it to move longitudinally in response to the thrust of spring 305' and the sloping teeth on collar 305 and hub 306. As the disc 307 moves, it carries with it the rod 333 whose tapered end engages keys 324 and cams them outwardly into engagement with the keyways 322 in hub 321, thus locking the member 318 to the driving shaft. At this time the drive is direct from the driving shaft to the driven shaft through keys 324, member 318, gear 323, gears 319 and 320 and ring gear 325, the clutch 314 over running to permit the gear carrier 313 to be rotated freely by the ring gear 318 without moving the driven disc 308.

In order to obtain a reverse drive the lever 334 is moved clockwise until rollers 309 are turned into such a position as to leave the outer edge of disc 308, axial movement of the disc 307 being prevented at this time since the rollers are still in engagement therewith. This movement of lever 334 causes it to engage and rock the lever 347 which moves lever 317 to release the brake 316, moves lever 345 to engage the brake 346 and shifts clutch member 330 into engagement with the teeth 328 on the carrier 327. There is no drive through the friction unit at this time since the rollers 309 are disengaged from the driven disc 308. The driving shaft turns sun gear 323 forwardly and since the ring gear 325 is held this produces a reverse rotation of the carrier 327 and the driven shaft, brake 316 being released to permit rotation of the carrier 313 with the ring gear 318 without driving the driven disc.

Figure 12 illustrates a modified form of transmission in which the friction unit is shown as being of the general type disclosed in the patent to Mellir No. 1,062,985. In this construction a driving shaft 350 is connected to a cammed collar 351, the cams of which mesh with complementary cams on a hub 352 of a driving disc 353 which is freely mounted on the driving shaft. The driving disc 353 has an annular driving edge which engages the surfaces of a series of spherical driving members 354 which are mounted for rotation on diametrical axles 355. The axles 355 are carried in frames or cages 356 which are rotatable about axes 357 to adjust the positions of axles 355.

A driven disc 358 is freely mounted on the driving shaft and also engages the driving members 354 and carries a sun gear 359. A double series of planet gears 360 (as shown in Figure 9) mounted on a carrier 361 which is connected to the driving shaft mesh with the sun gear and with a ring gear 362 which is connected to a driven shaft 363.

When the axles 355 are in the position shown on the line A—A the driven disc 358 will be driven in the same direction at the same speed as the driving disc 353, the gearing will rotate as a unit, and the driving ratio will be be 1:1 forward. As the frames 356 are tilted about axes 357 to bring the axles 355 toward the line B—B, the driven disc 358 will rotate in the same direction as the driving disc 353 and at a greater speed to produce an over-drive in which the driven shaft rotates faster than the driving shaft. Tilting of the axles 355 in the opposite direction causes the driven disc to rotate slower than the driving disc to produce a gear reduction until the axles 355 lie along the line C—C when the driven disc 358 and sun gear 359 are stationary, at which time the driven shaft will be rotated forwardly at a speed reduced in the same ratio as the gearing. Further tilting of the axles 355 toward the line D—D causes the driven disc 358 to rotate at a slower speed than the driving disc but in the opposite direction, thus producing a still further gear reduction. When the axles 355 reach the line D—D the driven disc is rotating reversely at the same ratio to the speed of the driving disc as the gear ratio so that the tendency for forward drive through the carrier 361 is exactly counterbalanced by the tendency for reverse drive through the sun gear 359 and the ring gear 362 and driven shaft 363 will remain stationary. This is the neutral position. If the axles 355 are tilted from neutral position D—D toward the line E—E the reverse rotation of the driven disc and the sun gear will be increased and the driven shaft will be rotated in a direction reverse to that of the driving shaft.

It will be understood that the positions A—A, B—B, etc. will not always be as indicated on the drawings but will vary with the gear ratio between the sun gear 359 and the ring gear 362. The positions shown in Figure 12 are based on a ring gear 362 having substantially twice as many teeth as the sun gear 359.

Figures 13 and 14 illustrate a power unit particularly intended for industrial applications and in which any of the above described transmissions may be employed. This unit is shown as constituted by a motor 375 which may be electrically propelled, a coupling indicated generally at 376 and a transmission all connected in series and mounted in casings or housings which are rigidly secured together to form a single unit. The motor drives a shaft 377 to which is rigidly splined a disc 378 having a peripheral flange 379 formed with grooves or notches 380. The shaft 377 terminates in a ball end 381 which is received in the bored end of a member 382 to permit universal movement therebetween. The member 382 has a plurality of radial bores in which are mounted round-ended plungers 383 which are forced outwardly into the grooves 380 in the flange 379 by compression springs 384. This provides an extremely simple universal coupling by which shaft 377 drives member 382 even though they are at a slight angle and which will yield an overload by camming plungers 383 back against the force of springs 384 to prevent damage to the parts due to overload or sudden shocks.

The member 382 is connected to a rotatable block 385 which drives a collar 386 having lugs 387 thereon which are engageable with cam grooves 388 formed in the collar of a driving disc 389. The driving disc 389 forms a part of a transmission such as is shown and described in any of the preceding figures and which drives a driven shaft 390 which may be connected to any suitable mechanism to be driven. The angularity of the transmission rollers and hence the transmission ratio is controlled by a suitable handwheel 391 projecting through the transmission housing and adapted to be adjusted by an operator.

Figure 15 illustrates a means of controlling the adjustment of the rollers in which three rollers are employed. It will be understood that this arrangement is equally applicable to transmissions in which more than three rollers are employed and further that it may be used with any of the transmissions hereinbefore described. In the arrangement of Figure 15 a transmission housing 400 is provided with a plurality of bored bosses 401 each having a pair of angular bores therein to receive the ends of shafts 402. Each of the bosses carries a ball 403 against which the ends of the shafts 402 rest and which can be adjusted by screw threaded plugs 404 to take up any end play in the shafts.

Each of the shafts 402 is formed with or carries a housing or cage 405 in which a roller 406 is rotatably mounted. Each shaft 402 is also provided with a bevel gear 407, the bevel gears at the adjacent ends of the shafts intermeshing, the lower shaft being shown with two bevel gears and the two side shafts with only one each at their lower ends. The two side shafts are provided adjacent their upper ends with worm gears 408 of opposite pitch which mesh with worms 409 of opposite pitch formed on a shaft 410 which is journalled in the casing and carries a handwheel 411.

By turning the handwheel 411 all of the shafts 402 will be rotated simultaneously to produce a simultaneous adjustment of the rollers.

While several embodiments of the invention have been shown and described it will be apparent that many changes might be made therein and it is not my intention to be limited to the forms shown or otherwise than by the terms of the appended claims.

I claim:

1. A transmission comprising a friction toroidal unit including angularly adjustable rollers, a gear chain connected to said toroidal unit and including a plurality of elements, clutch members on two of said elements, brake means for holding one or another of said elements stationary, a drive shaft having a clutch member adapted to engage one or the other of said first mentioned clutch members, and a single control means for adjusting said rollers, actuating said brake means and shifting said last named clutch member.

2. A transmission comprising a driving disc, a driven disc, an adjustable roller therebetween adapted to be moved out of engagement with one of said discs, said one disc being axially movable when the roller is moved out of engagement therewith, a gear chain including relatively movable elements, and means controlled by axial movement of said disc for locking said gear chain elements against relative movement.

3. A transmission for connecting a driving member to a driven member comprising a planetary gear train, one element of which is connected to the driving member and another element of which is connected to the driven member, and a variable speed variable torque means comprising a driving toroidal race connected to the driving member, a driven race connected to a third element of the gear train, and traction rollers in driving engagement with said races, said transmission being so constructed and arranged that reaction torque on the driven member tends to turn said third element in a direction opposite to that in which it is turned by the driven race whereby said variable torque means transmits less power than the input power.

4. A transmission for connecting a driving member to a driven member comprising a planetary gear train, one element of which is connected to the driving member and another element of which is connected to the driven member, and a variable speed variable torque means comprising a driving toroidal race connected to the driving member, a driven race connected to a third element of the gear train, and traction rollers in driving engagement with said races, said gear train being so constructed and arranged that the reaction of the driven member tends to oppose normal motion of both of the elements of the gear train which are connected to the driving member and to the variable torque means.

5. A transmission for connecting a driving shaft to a driven shaft comprising a planetary gear set having a gear carrier connected to the driving shaft, a gear member meshing with planet gears on said carrier connected to the driven shaft and a second gear member meshing with said planet gears, and a variable speed variable torque device including a driving toroidal race connected to the driving shaft, a driven race connected to said second gear member and traction rollers engaging said races to drive the driven race from and in the opposite direction to the driving race whereby reaction torque on the driven shaft tends to turn said second gear member in a direction opposite to that in which it is turned by said variable torque device.

6. A transmission for connecting a driving shaft to a driven shaft comprising a driving toroidal race connected to the driving shaft, a driven toroidal race, a traction roller engaging said races to drive the driven race from and in the opposite direction to the driving race, a differential gear set including a pair of gear members and a planet carrier carrying pinions meshing with said gear members, said planet carrier being connected to the driven shaft and one of said gear members being connected to the driving shaft, and reversing means connecting the other of said gear members to said driven race.

7. A transmission for connecting a driving shaft to a driven shaft comprising a driving toroidal race connected to the driving shaft, a driven toroidal race, a traction roller engaging said races to drive the driven race from and in the opposite direction to the driving race, a differential gear set including a gear carrier connected to the driven shaft and carrying planet pinions, a sun gear meshing with said pinions and connected to the driving shaft, a ring gear meshing with said pinions, and reversing means connecting the ring gear to said driven race.

8. A transmission for connecting a driving shaft to a driven shaft comprising a driving toroidal race connected to the driving shaft, a driven toroidal race, a traction roller engaging said races to drive the driven race from and in the opposite direction to the driving race, a differential gear set including a gear carrier connected to the driven shaft and carrying planet pinions, a sun gear meshing with said pinions and connected to the driving shaft, a double ring gear having a portion meshing with said planet pinions, a pinion rotatable on a fixed axis and meshing with another portion of said ring gear, and a gear member connected to the driven race and meshing with said last named pinion to drive the ring gear in the same direction as the driving shaft.

ADIEL Y. DODGE.